United States Patent [19]

Taniji

[11] Patent Number: 5,229,857
[45] Date of Patent: Jul. 20, 1993

[54] SOLID STATE IMAGING APPARATUS WITH LARGE ELECTRIC CHARGE AMOUNT IN VERTICAL TRANSFER

[75] Inventor: Yukio Taniji, Tokyo, Japan

[73] Assignee: NEC Corporation, Tokyo, Japan

[21] Appl. No.: 612,266

[22] Filed: Nov. 9, 1990

[30] Foreign Application Priority Data

Nov. 9, 1989 [JP] Japan ................ 1-292731

[51] Int. Cl.$^5$ ................ H04N 3/14; H04N 5/335
[52] U.S. Cl. .................... 358/213.11; 358/213.23; 358/213.22
[58] Field of Search ............. 358/213.11, 213.22, 358/213.23, 213.29, 213.31, 209

[56] References Cited

U.S. PATENT DOCUMENTS

| | | | |
|---|---|---|---|
| 3,777,061 | 12/1973 | Takemura | 358/213.22 |
| 4,769,709 | 9/1988 | Van De Steeg | 358/213.31 |
| 4,831,453 | 5/1989 | Takemura | 358/213.22 |
| 4,839,739 | 6/1989 | Takemura | 358/213.22 |
| 5,051,832 | 9/1991 | Losee et al. | 358/213.29 |

*Primary Examiner*—Michael T. Razavi
*Assistant Examiner*—Wendy R. Greening

[57] ABSTRACT

A solid state imaging apparatus includes a solid state imager of an interline charge transfer device type, including a number of photoelectric conversion cells arranged in the form of matrix, and a reading gate provided between each of photoelectric conversion cells in each one column and one adjacent vertical transfer register and controlled for reading an electric charge stored in one of each N photoelectric conversion cells to the adjacent vertical transfer register. A memory is connected to receive an image signal sequentially outputted from the solid state imager, and has a capacity corresponding to a double of the number of the photoelectric conversion cells of the solid state imager. A control circuit is provided for controlling driving of the solid state imager and the memory in such a manner that after a reading operation of the solid state imager is performed N times so as to store into a first half of the memory an image signal detected by all the photoelectric conversion cells of the solid state imager, an image signal is read out from the first half of the memory in accordance with a desired television format, and concurrently, a reading operation of the solid state imager is performed so as to store into a second half of the memory an image signal detected by the photoelectric conversion cells of the solid state imager.

6 Claims, 7 Drawing Sheets

SOLID STATE IMAGING APPARATUS WITH LARGE ELECTRIC CHARGE AMOUNT IN VERTICAL TRANSFER

BACKGROUND OF THE INVENTION

1. Field of the Invention

The present invention relates to a solid state imaging apparatus, and more specifically, a solid state imaging apparatus operable in an interlaced scanning or non-interlaced scanning schema. Particularly, the solid state imaging apparatus in accordance with the present invention is usable in the case of using a charge-coupled device (CCD) type of solid state imager.

2. Description of Related Art

With recent advancement in technology, a solid state imager has been miniaturized more and more, and resolution of the solid state imager has been increased more and more. In addition, sensitivity such as S/N ratio has been steadily improved with improvement in on-chip amplifiers and signal processing performed by peripheral circuits. However, realization of increased resolution cannot avoid decrease of an area of each photoelectric conversion cell and decrease of a width of a vertical transfer register, and also, a dynamic range of an output signal has been inevitably decreased.

Most of conventional solid state imagers have been designed on the premise of a 2:1 interlaced scanning in accordance with a current television format. Therefore, each vertical transfer register has been constructed so that one independent potential well is provided for each pair of photoelectric conversion cells arranged adjacent to each other in a vertical direction. On the other hand, a non-interlaced scanning has been proposed in an extended definition TV (EDTV) which is now considered for improvement of a picture quality in a television broadcasting. In this case, one independent potential well is required for each one photoelectric conversion cell.

As mentioned above, in the solid state imagers, a charge amount transferred in the vertical transfer register has a tendency to decrease more and more. Therefore, the width of the vertical transfer register has been now designed in consideration of balance between sensitivity and a maximum output of the photoelectric conversion cell. As a result, the degree of freedom in design has become small, and the dynamic range of the solid state imager has been greatly restricted.

SUMMARY OF THE INVENTION

Accordingly, it is an object of the present invention to provide a solid state imager which has overcome the above mentioned defect of the conventional one.

Another object of the present invention is to provide a solid state imager provided with a vertical transfer register having potential wells each having an increased area, so that a remarkably enlarged dynamic range can be realized while ensuring a high degree of resolution.

The above and other objects of the present invention are achieved in accordance with the present invention by a solid state imaging apparatus comprising:

a solid state imager of an interline charge transfer device type including a number of photoelectric conversion cells arranged in the form of matrix, a plurality of vertical transfer registers each of which is arranged to extend adjacent to and along a corresponding one column of photoelectric conversion cells, means provided between each one column of photoelectric conversion cells and one adjacent vertical transfer register for reading an electric charge stored in one of each N photoelectric conversion cells to the adjacent vertical transfer register (where N is natural number not less than 2), a horizontal transfer register located at output ends of all the vertical transfer registers, and an output amplifier located at an output of the horizontal transfer register;

a memory receiving an image signal sequentially outputted from the solid state imager and having a capacity corresponding to a double of the number of the photoelectric conversion cells of the solid state imager; and a control circuit for controlling driving of the solid state imager and the memory in such a manner that after a reading operation of the solid state imager is performed N times so as to store into a first half of the memory an image signal detected by all the photoelectric conversion cells of the solid state imager, an image signal is read out from the first half of the memory in accordance with a desired television format, and concurrently, a reading operation of the solid state imager is performed so as to store into a second half of the memory an image signal detected by the photoelectric conversion cells of the solid state imager.

Preferably, N is not less than 3, and more preferably, an even number not less than 4.

The above and other objects, features and advantages of the present invention will be apparent from the following description of preferred embodiments of the invention with reference to the accompanying drawings.

DESCRIPTION OF THE PREFERRED EMBODIMENTS

Figure 1:
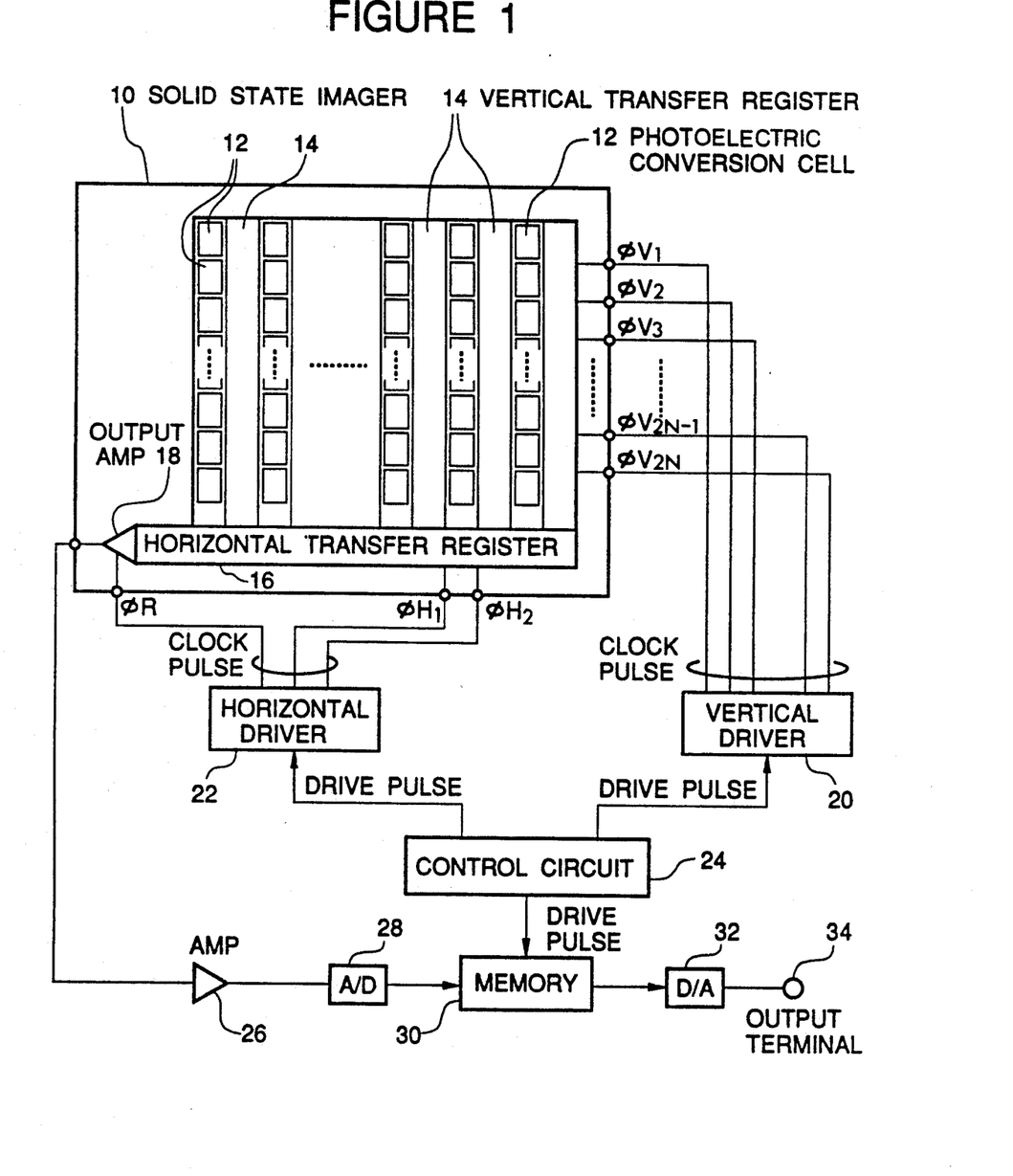
FIG. 1 is a block diagram of one embodiment of the solid state imaging apparatus in accordance with the present invention.

Referring to FIG. 1, there is shown a block diagram of one embodiment of the solid state imaging apparatus in accordance with the present invention. The shown solid state imaging apparatus includes a solid state imager 10 of an interline charge transfer device type, which comprises a number of photoelectric conversion cells 12 arranged in the form of matrix having a plurality of rows and a plurality of columns, a plurality of vertical transfer registers 14 each of which is arranged to extend adjacent to and along one corresponding column of photoelectric conversion cells 12, a horizontal transfer register 16 located at output ends of all the vertical transfer registers 14, and an output amplifier 18 located at an output of the horizontal transfer register 16. The vertical transfer register 14 is so constructed to be driven by 2N clock pulse lines, and therefore with a clock pulse of 2N phases at maximum.

In the shown embodiment, clock pulses $\phi_{V1}$, $\phi_{V2}$, ... $\phi_{V2N}$ are supplied from a vertical drive circuit 20 to each vertical transfer register 14 of the solid state imager 10, and clock pulses $\phi_{H1}$ and $\phi_{H2}$ are supplied from a horizontal drive circuit 22 to the horizontal transfer register 14 of the solid state imager 10. In addition, another clock pulse $\phi_R$ is supplied from the horizontal drive circuit 22 to the output amplifier 18. Each of the vertical drive circuit 20 and the horizontal drive circuit 22 receives a drive pulse from a control circuit 24.

An analog image signal outputted from the output amplifier 18 is amplified by an amplifier 26 and is converted into a digital image signal by an A/D converter 28. The digital image signal is stored in a memory 30 in synchronism with a drive pulse supplied to the memory 30 from the control circuit 24. The memory has a capacity corresponding to a double of the number of the photoelectric conversion cells of the solid state imager, and used so as to alternatively perform a first read/-write mode in which the digital image signal from the A/D converter 28 is stored in a first half of the memory and the image signal stored in a second half of memory is read out, and a second read/write mode in which the digital image signal from the A/D converter 28 is stored in the second half of the memory and the image signal stored in the first half of memory is read out. In addition, a digital image signal read from the memory 30 is converted by a D/A converter 32 into an analog image signal, which is outputted from an output terminal 34.

Now, detailed construction and operation of the solid state imager will be explained by way of an example of 2N=8, with reference to the partial plan pattern view of FIG. 2 and the timing charts of FIGS. 3 and 4.

Figure 2:
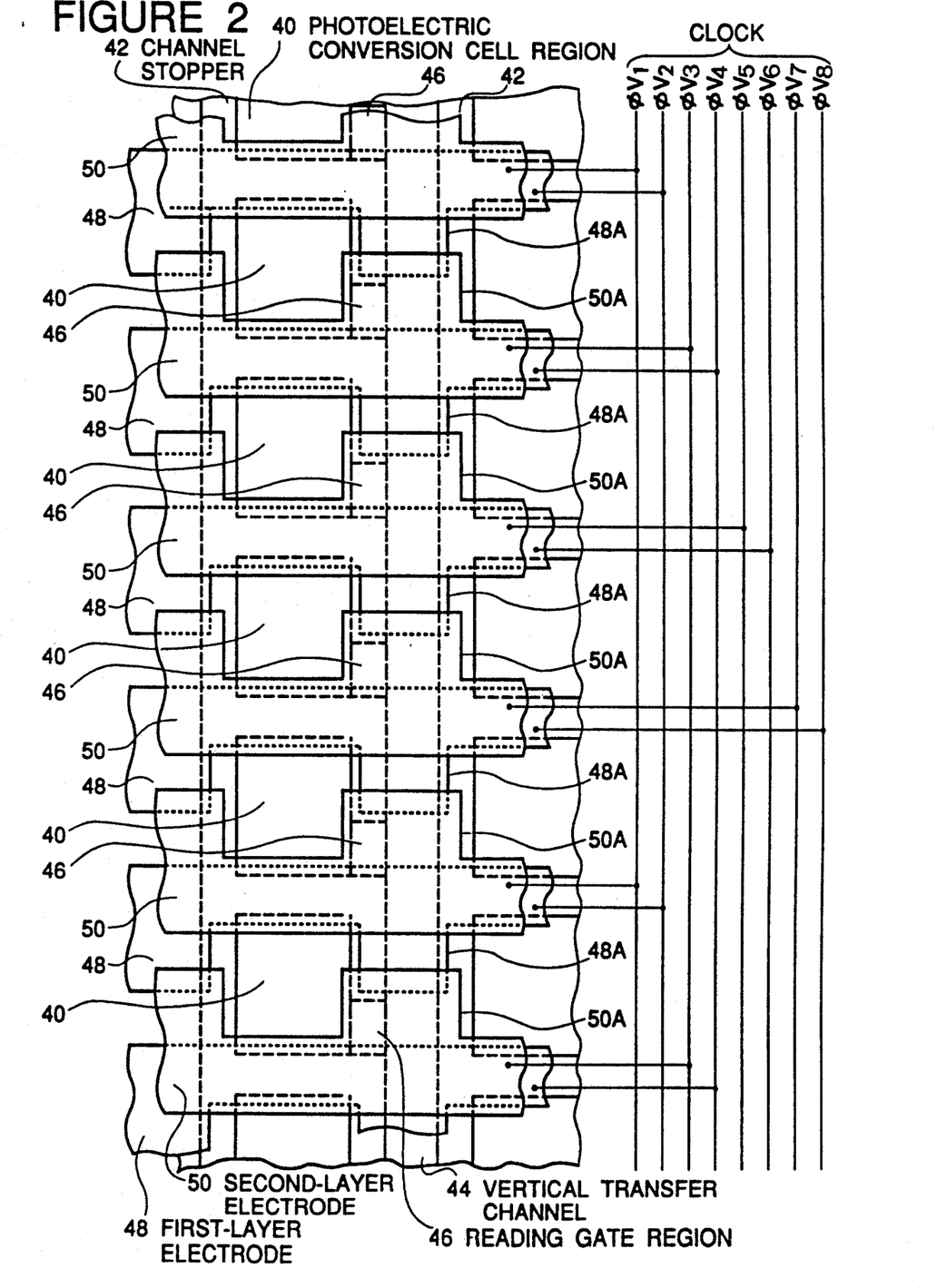
FIG. 2 is a diagrammatic partial plan view of the solid state imager used in the solid state imaging apparatus shown in FIG. 1.

Referring to FIG. 2, there is shown a diagrammatic partial plan view of the solid state imager shown in FIG. 1. The shown solid state imager has substantially the same construction as that of a conventional interline charge transfer device. The shown solid state imager includes a plurality of photoelectric conversion cell regions 40, which are formed in a substrate (not shown) and each of which is confined by a channel stop 42 also formed in the not-shown substrate. All of the photoelectric conversion cell regions 40 arrayed in each one column are coupled, in parallel, to one vertical transfer channel 44 through a reading gate region 46 associated with each one of the photoelectric conversion cell regions 40.

In addition, the shown solid state imager includes a plurality of first-layer electrodes 48, each of which is formed to horizontally extend on a boundary portion (horizontal portion of the channel stopper) between each pair of adjacent rows of photoelectric conversion cell regions 40. Each of the first-layer electrodes 48 has a projection 48A at an intersection between each vertical transfer channel 44 and the first-layer electrode 48. The projection 48A extends along and above the vertical transfer channel 44 (in a downward direction in the drawing) and terminates so as not to overlap the reading gate region 46.

Furthermore, on each of the first-layer electrodes 48, there is provided one second-layer electrode 50 extending along and above the first-layer electrode 48. Each of the second-layer electrodes 50 has a projection 50A, which is located at an intersection between each vertical transfer channel 44 and the second-layer electrode 50, and which extends along and above the vertical transfer channel 44 (in an upward direction in the drawing) so as to cover the reading gate region and partially overlap a corresponding projection 48A of the first-layer electrode 48.

The first layer electrodes 48 and the second-layer electrodes 50 constitute a vertical transfer electrode assembly of a vertical transfer register having the vertical transfer channel 44. In addition, the second-layer electrodes 50 also acts as a reading gate electrode for transferring an electric charge stored in the corresponding photoelectric conversion cell region 40 to the adjacent vertical transfer channel 44, by utilizing potential difference between channels realized by application of a tri-level pulse to the second-layer electrodes 50.

Here, it should be noted that, although not shown, the first-layer electrodes 48 and the second-layer electrodes 50 are isolated from the not-shown substrate and from one another by insulation layers not shown for simplification of drawing. In addition, the vertical transfer channel 44 is actually covered a light shielding layer, but, the light shielding layer is omitted in the drawing for simplification of drawing.

As shown in FIG. 2, each four continuously arranged second-layer electrodes 50 and the first-layer electrodes 48 underlying the four second-layer electrodes 50 form one group of transfer electrodes, and connected to eight different clock lines $\phi_{V1}$ to $\phi_{V8}$, respectively. In each group of transfer electrodes, a first one of the four continuously arranged second-layer electrodes 50 is connected to receive a first clock $\phi_{V1}$, and the first-layer electrode 48 underlying the first second-layer electrode 50 is connected to receive a second clock $\phi_{V2}$. A second one of the four continuously arranged second-layer electrodes 50 is connected to receive a third clock $\phi_{V3}$, and the first-layer electrode 48 underlying the second second-layer electrode 50 is connected to receive a fourth clock $\phi_{V4}$. A third one of the four continuously arranged second-layer electrodes 50 is connected to receive a fifth clock $\phi_{V5}$, and the first-layer electrode 48 underlying the third second-layer electrode 50 is connected to receive a sixth clock $\phi_{V6}$. A fourth one of the four continuously arranged second-layer electrodes 50 is connected to receive a seventh clock $\phi_{V7}$, and the first-layer electrode 48 underlying the fourth second-layer electrode 50 is connected to receive a eighth clock $\phi_{V8}$.

The above mentioned solid state imager is characterized by provision of eight transfer clock lines or conductors $\phi_{V1}$ to $\phi_{V8}$ for receiving a eight-phase transfer clock from an external apparatus (namely, the vertical driver). This redundant number of clock lines or conductors is contrary to a conventional solid state imager having three or four transfer lines or conductors so that a three-phase or four-phase clock pulse is applied for a charge transfer in a vertical transfer register.

Figure 4:
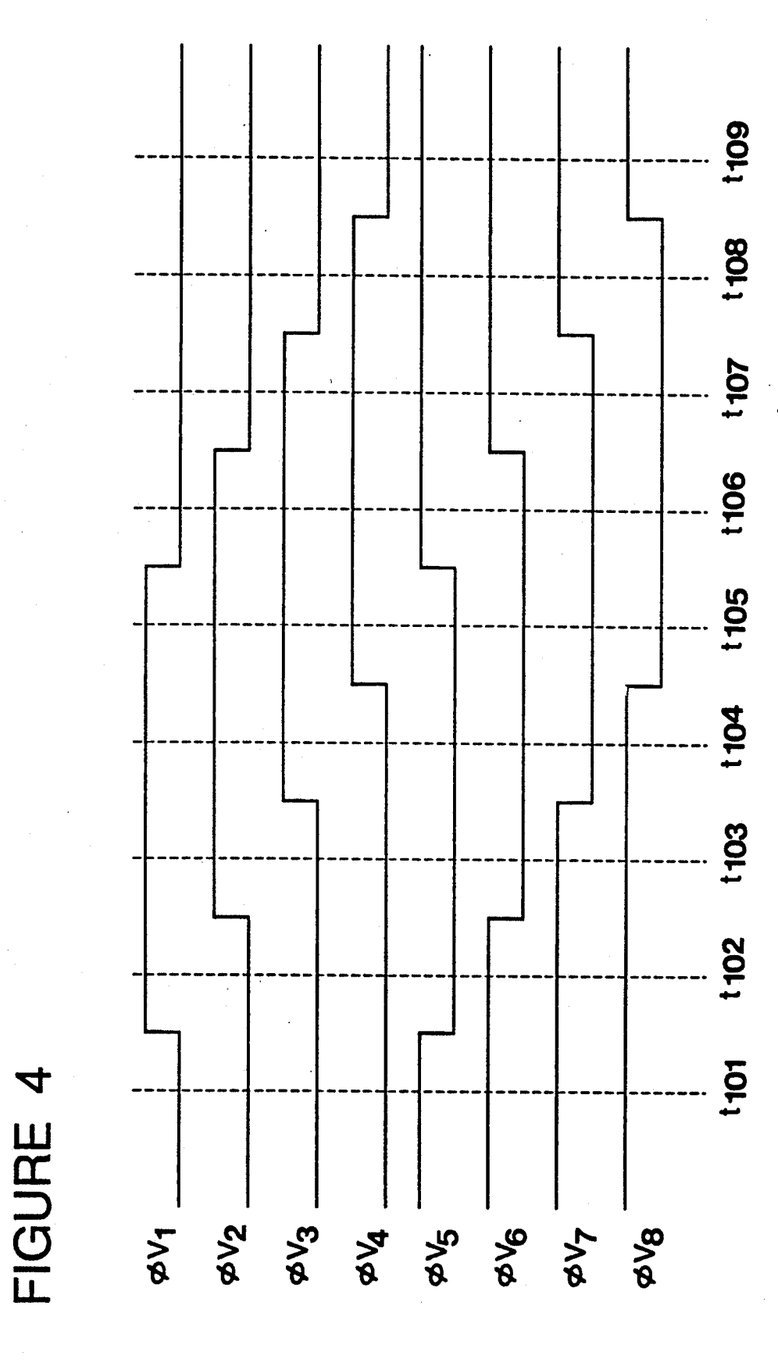
FIG. 4 is a timing chart illustrating a transfer operation shown in FIG. 3 corresponding to a transfer of one stage in a vertical direction.

Thus, the transfer electrodes of each vertical transfer register having the above mentioned arrangement can be supplied with clock pulses $\phi_{V1}$ to $\phi_{V8}$ of 8 phases at maximum, as shown in FIG. 4. In this case, therefore, the number of electrodes ceaselessly cooperating to form one potential well maintained in a storage condition is four, and therefore, the vertical transfer register can transfer an electric charge amount which is double the transfer charge amount in a conventional four-phase clock transfer. On the other hand, the number of the potential wells concurrently existing in one vertical transfer register becomes a half, and therefore, a vertical resolution obtained in one complete vertical transfer will also become a half. In order to obtain the vertical resolution in accordance with the television standard, it is necessary to perform two 2:1 interlaced scanning operations in each one field, so that reading and outputting of charges from all the photoelectric conversion cells are completely executed within one field.

On the other hand, if the non-interlaced scanning is performed, further double reading operations are required. In other words, a 4:1 interlaced reading operation is performed. For example, as shown in FIG. 3, a reading pulse $P_R$ is sequentially superimposed on a first transfer clock $\phi_{V1}$ in a first one-fourth field $T_1$, on a first transfer clock $\phi_{V3}$ in a second one-fourth field $T_2$, on a first transfer clock $\phi_{V5}$ in a third one-fourth field $T_3$, and on a first transfer clock $\phi_{V7}$ in a fourth one-fourth field $T_4$. Therefore, when the reading pulse $P_R$ is superimposed on the first transfer clock $\phi_{V1}$ in the first one-fourth field $T_1$, an electric charge stored in the photoelectric conversion cell 40 having the reading gate region controlled by the second-layer electrode 50 connected to receive the clock pulse $\phi_{V1}$ is transferred to the associated vertical transfer channel 44, and no electric charge is transferred from the photoelectric conversion cell 40 having the reading gate region controlled by the second-layer electrode 50 connected to receive the clock pulse $\phi_{V3}$, $\phi_{V5}$ or $\phi_{V7}$. When the reading pulse $P_R$ is superimposed on the first transfer clock $\phi_{V3}$ in the second one-fourth field $T_2$, only an electric charge stored in the photoelectric conversion cell 40 having the reading gate region controlled by the second-layer electrode 50 connected to receive the clock pulse $\phi_{V3}$ is transferred to the associated vertical transfer channel 44, and so on.

Thus, the image signal read out as mentioned above is applied to the amplifier 26 and converted into a digital signal by the A/D converter 28, and then, stored in the memory 30 under the control of the control circuit 24. In a field next to the field in which the image signal was read out from the solid state imager, the digital image signal stored in the memory 30 is read out from the memory 30 under control of the control circuit 24 in accordance with a desired interlaced scanning operation or non-interlaced scanning operation, so that a desired interlaced or non-interlaced scanned image signal is outputted from the memory 30 through the D/A converter 32.

As seen from the above, the above mentioned embodiment is characterized in that formation of the potential well in the vertical transfer register is modified so as to increase the amount of electric charge being transferred, and the read-out image signal is stored in a memory so that an interlace conversion can be made by controlling the reading of the image signal stored in the memory. Therefore, the dynamic range of the solid state imager can be improved, and also, it is possible to reduce the width of the vertical transfer register while maintaining the amount of electric charge being transferred. This is effective in elevating sensitivity and in improving balance between the sensitivity and the maximum output of the photoelectric conversion cell.

Figure 3:
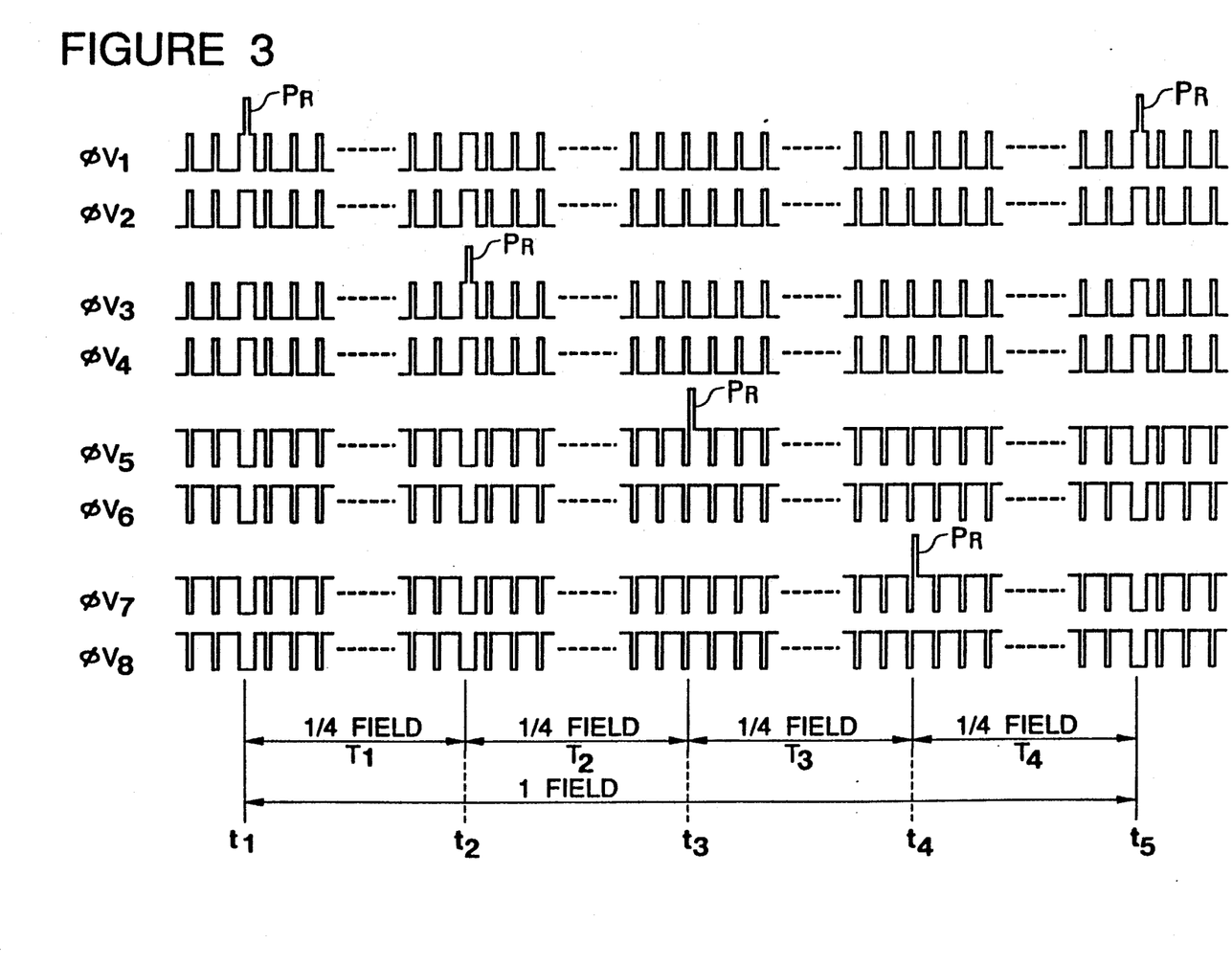
FIG. 3 is a timing chart illustrating a vertical transfer driving for the solid state imager shown in FIG. 2.

In the example shown in FIG. 3, four electrodes of each eight transfer electrodes are ceaselessly in a charge storage condition. However, since a barrier for isolating the potential wells from one another can be constructed by two electrodes, the maximum number of electrodes used for storing the electric charge is six ($6=8-2$). In this case, the amount of electric charge which can be transferred in the vertical transfer register becomes three times the amount of the conventional one.

In addition, if the clock pulse lines $\phi_{V1}$ and $\phi_{V5}$, the clock pulse lines $\phi_{V2}$ and $\phi_{V6}$, the clock pulse lines $\phi_{V3}$ and $\phi_{V7}$, the clock pulse lines $\phi_{V4}$ and $\phi_{V8}$ are connected commonly each other by an external circuit or wiring, a solid state imager of the same construction as that of the conventional one can be realized. This is very convenient in feasibility.

Figure 5:
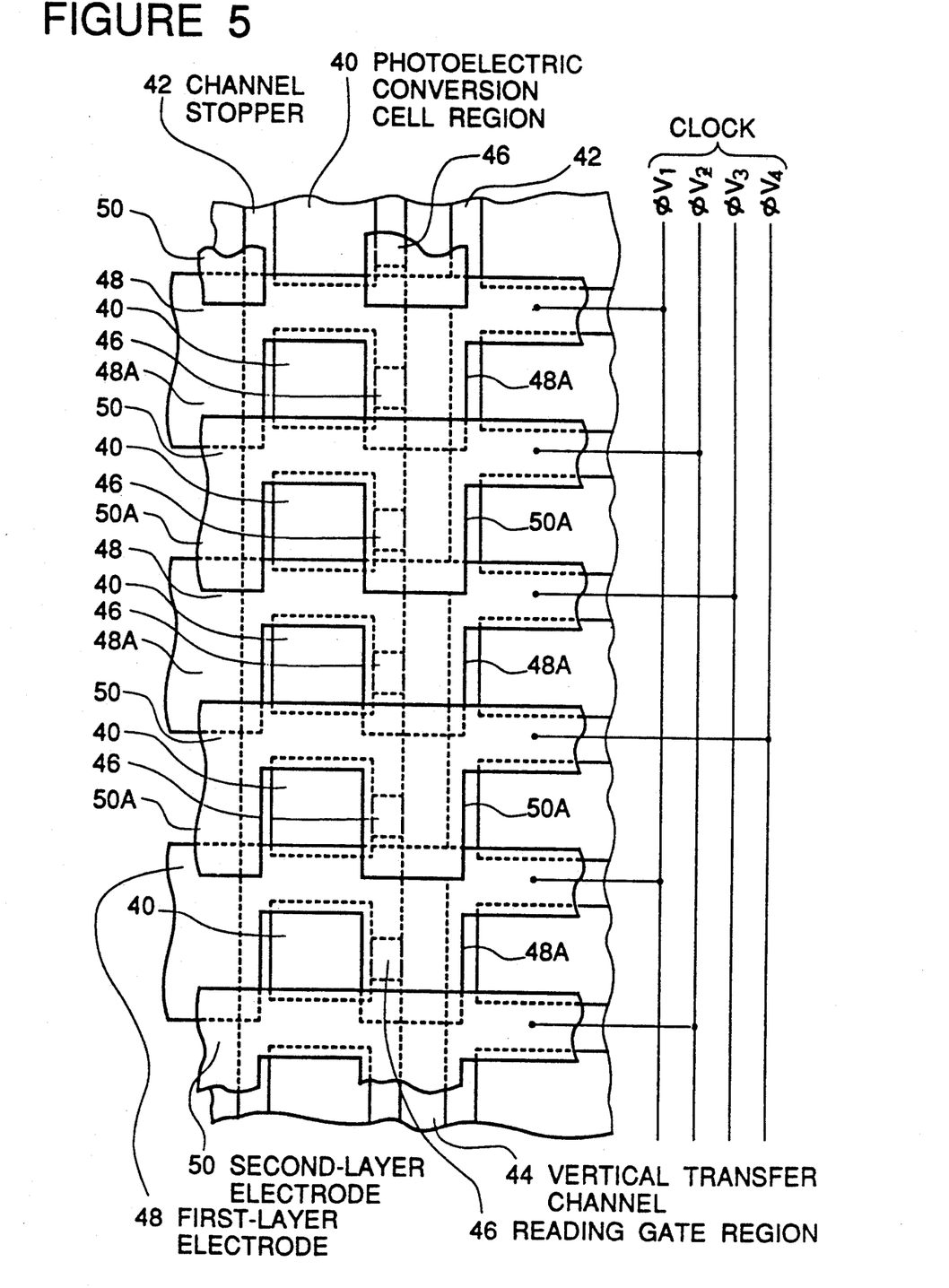
FIG. 5 is a view similar to FIG. 2 but showing another structure of the solid state imager used in the solid state imaging apparatus shown in FIG. 1.

Referring to FIG. 5, there is shown another structure of the solid state imager used in the solid state imaging apparatus shown in FIG. 1. In FIG. 5, elements similar or corresponding to those shown in FIG. 2 are given the same Reference Numerals.

As will be seen from comparison between FIGS. 2 and 5, the embodiment shown in FIG. 5 is featured in that, in a vertical transfer direction, only one vertical transfer electrode (either the first-layer electrode 48 or the second-layer electrode 50) is provided for each one photoelectric conversion cell 40. Namely, the number of the clock pulse lines is decreased to 4. In other words, the embodiment is designed on the premise of an N:1 interlaced scanning (N=4 in the shown embodiment).

Figure 7:
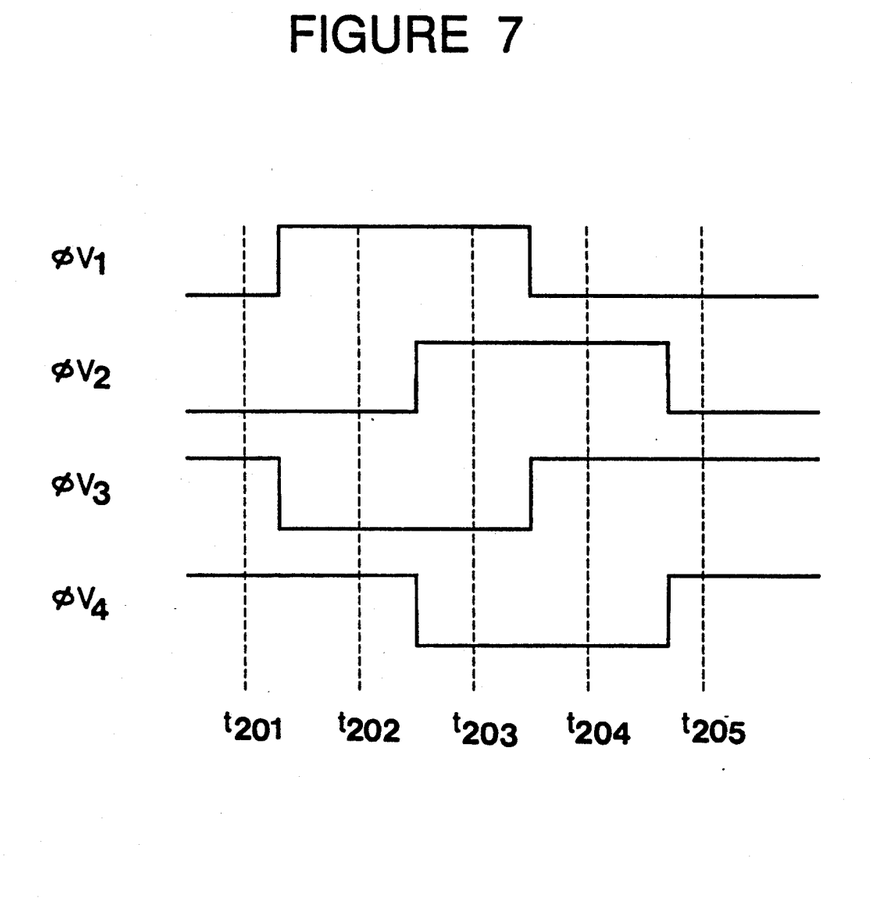
FIG. 7 is a timing chart illustrating a transfer operation shown in FIG. 6 corresponding to a transfer of one stage in a vertical direction.

Thus, the transfer electrodes of each vertical transfer register in the second embodiment are supplied with clock pulses $\phi_{V1}$ to $\phi_{V4}$ of 4 phases at maximum, as shown in FIG. 7.

Figure 6:
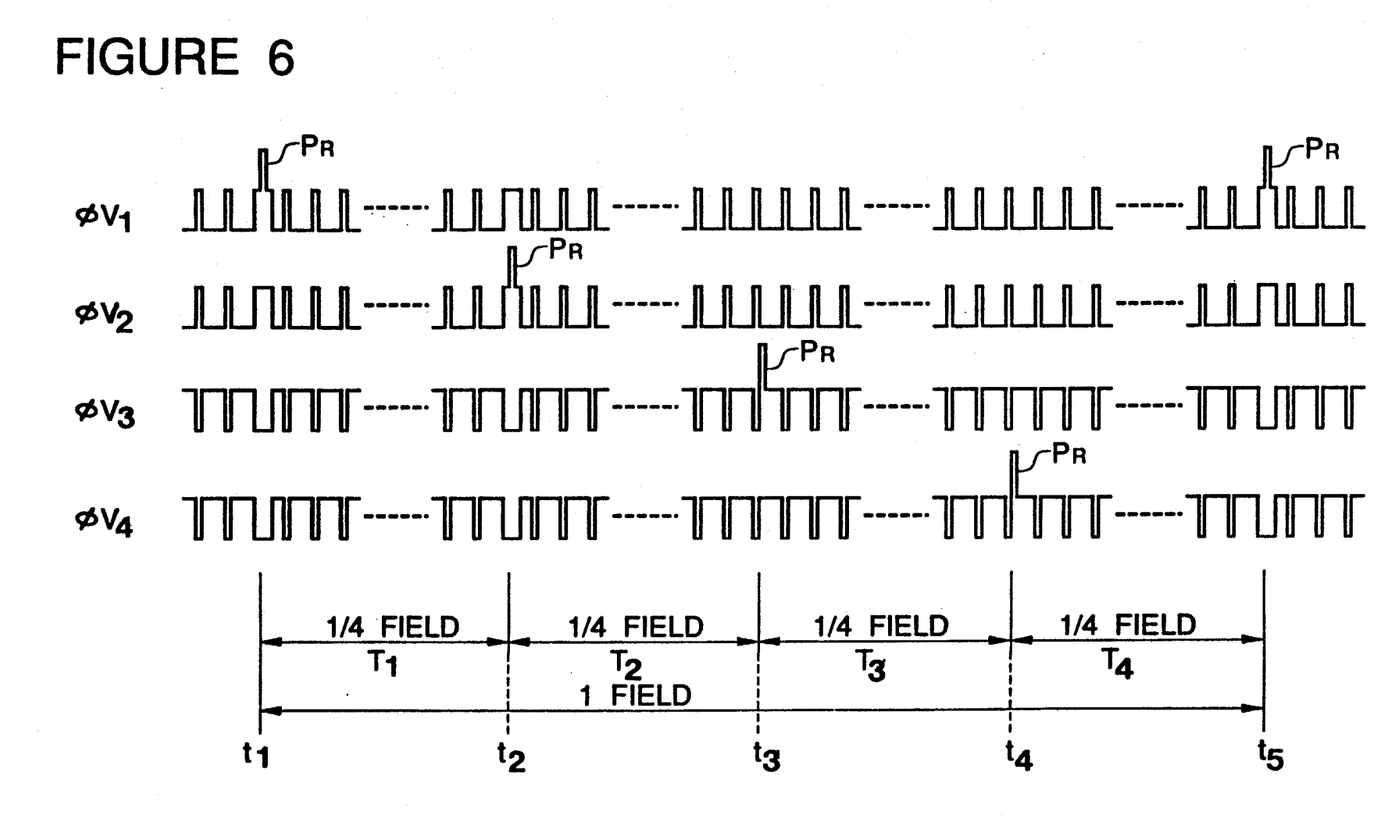
FIG. 6 is a timing chart illustrating a vertical transfer driving for the solid state imager shown in FIG. 5.

In addition, in order to realize a non-interlaced scanning in the second embodiment, it is required to perform four reading and transfer operations within each one field, as shown in FIG. 6 and similarly to the first embodiment.

In the second embodiment, the area of the potential well concurrently in the storage condition is double at maximum in comparison with the conventional one, and therefore, smaller than that of the first embodiment. However, the second embodiment is remarkably simpler than the first embodiment in construction and smaller than the first embodiment in the number of required clock electrode or wirings. Therefore, the second embodiment is more convenient in phase margin of a clock and in packaging.

As seen from the above description, the solid state imager in accordance with the present invention is characterized in that the vertical transfer register forms one potential well for each N photoelectric conversion cells so that an N:1 interlaced scanning is performed, and the image signal obtained by the N:1 interlaced scanning is converted into a desired television format by storing the N:1 interlaced image signal into a memory and then reading the image signal stored in the memory in the order complying with the desired television format. Therefore, each of potential wells formed in a vertical transfer register can have an increased area, so that a remarkably enlarged dynamic range can be realized while ensuring a high degree of resolution.

The invention has thus been shown and described with reference to the specific embodiments. However, it should be noted that the present invention is in no way limited to the details of the illustrated structures but changes and modifications may be made within the scope of the appended claims.

I claim:

1. A solid state imaging apparatus comprising:

a solid state imager of an interline charge transfer device type including a number of photoelectric conversion cells arranged in the form of matrix, a plurality of vertical transfer registers each of which is arranged to extend adjacent to and along a corresponding one column of photoelectric conversion cells, reading means provided between each one column of photoelectric conversion cells and one adjacent vertical transfer register for reading and transferring an electric charge stored in each one of N photoelectric conversion cells to said adjacent vertical transfer register (where N is natural number not less than 2), a horizontal transfer register located at output ends of all the vertical transfer registers, and an output amplifier located at an output of the horizontal transfer register, said reading means performing said transferring of the electric charge stored in one of each N photoelectric conversion cells to said adjacent vertical transfer register N times in such a manner that each of N transferrings is made for a different one of each N photoelectric conversion cells;

a memory receiving an image signal sequentially outputted from said solid state imager and having a capacity corresponding to a double of the number of the photoelectric conversion cells of said solid state imager; and a control circuit connected to said memory and to said solid state imager for controlling driving of said solid state imager and said memory such that after said transferrings have been performed N times an image signal for one image detected by all said photoelectric conversion cells of said solid state imager is stored into a first half of said memory and said image signal is read out from said first half of said memory in accordance with a desired television format, and concurrently, said reading means transfers the electric charge stored in one of each N photoelectric conversion cells to said adjacent vertical transfer register so that an image signal for a next one image detected by said photoelectric conversion cells of said solid state imager is stored into a second half of said memory.

2. A solid state imaging apparatus claimed in claim 1 wherein N is not less than 3.

3. A solid state imaging apparatus claimed in claim 1 wherein N is an even number not less than 4.

4. A solid state imaging apparatus comprising:

a solid state imager of an interline charge transfer device type including a number of photoelectric conversion cells arranged in the form of matrix, a plurality of vertical transfer registers each of which is arranged to extend adjacent to and along a corresponding one column of photoelectric conversation cells, reading means provided between each one column of photoelectric conversion cells and one adjacent vertical transfer register for reading and transferring an electric charge stored in each one of each N photoelectric conversion cells to said adjacent vertical transfer register (where N is natural number not less than 2), a horizontal transfer register located at output ends of all the vertical transfer registers, and an output amplifier located at an output of the horizontal transfer register, said reading means performing said transferring of the electric charge stored in one of each N photoelectric conversion cells to said adjacent vertical transfer register N times in such a manner that each of N transferrings is made for a different one of each N photoelectric conversion cells;

a memory receiving an image signal sequentially outputted from said solid state imager and having a capacity corresponding to a double of the number of the photoelectric conversion cells of said solid state imager; and a control circuit connected to said memory and to said solid state imager for controlling driving of said solid state imager and said memory such that after said transferrings have been performed N times in said manner, an image signal for one image detected by all said photoelectric conversion cells of said solid state imager is stored into a first half of said memory and said image signal is read out from said first half of said memory in accordance with a desired television format, and concurrently, said reading means transfers the electric charge stored in one of each N photoelectric conversion cells to said adjacent vertical transfer register so that an image signal for a next one image detected by said photoelectric conversion cells of said solid state imager is stored into a second half of said memory, wherein said reading means includes a reading gate provided between each of photoelectric conversion cells in each one column and one adjacent vertical transfer register so as to transfer an electric charge stored in each photoelectric conversion cell into said one adjacent vertical transfer register, said reading gate being selectively opened by said control circuit so that an electric charge stored in only a selected one of N photoelectric conversion cells is transferred to said adjacent vertical transfer register.

5. A solid state imaging apparatus claimed in claim 4 wherein N is not less than 3.

6. A solid state imaging apparatus claimed in claim 4 wherein N is an even number not less than 4.

* * * * *